United States Patent [19]

Nonn et al.

[11] 4,295,849
[45] Oct. 20, 1981

[54] PROCESS FOR THE PREPARATION OF DYESTUFF FORMULATIONS

[76] Inventors: Konrad Nonn; Karlheinz Wolf; Artur Haus; Reinhold Hörnle, all of Bayer AG, Leverkusen, Fed. Rep. of Germany, D-5090

[21] Appl. No.: 775,898

[22] Filed: Mar. 9, 1977

[30] Foreign Application Priority Data

Mar. 11, 1976 [DE] Fed. Rep. of Germany ....... 2610094

[51] Int. Cl.$^3$ .................. C09B 67/38; D06P 1/645
[52] U.S. Cl. ........................... 8/524; 8/471; 8/602; 8/611; 8/580
[58] Field of Search .................. 8/2.5 R, 2.5 A, 169, 8/79, 171, 588, 471, 602, 611, 524

[56] References Cited

U.S. PATENT DOCUMENTS

| | | | |
|---|---|---|---|
| 2,768,054 | 10/1956 | Armento et al. | 8/169 |
| 2,828,180 | 3/1958 | Sertorio | 8/71 |
| 3,390,947 | 7/1968 | Shown et al. | 8/169 |
| 3,652,198 | 3/1972 | Farber et al. | 8/169 |
| 3,925,007 | 12/1975 | Gurtler | 8/91 |
| 3,960,486 | 6/1976 | Daubach et al. | 8/169 |
| 3,977,828 | 8/1976 | Becker et al. | 8/79 |
| 4,184,843 | 1/1980 | Baumann | 8/580 |
| 4,235,597 | 11/1980 | Reinert | 8/526 |

FOREIGN PATENT DOCUMENTS 1368385  9/1974  United Kingdom .

OTHER PUBLICATIONS

Lynn, J. E. et al. ed. *Advances in Textile Processing vol. 1.* Textile Book Publ. Co., N. Y. 1961 pp. 340-342.

*Primary Examiner*—Joseph L. Schofer
*Assistant Examiner*—Maria Parrish Tungol
*Attorney, Agent, or Firm*—Sprung, Felfe, Horn, Lynch & Kramer

[57] ABSTRACT

The invention relates to the preparation of pulverulent formulations of transfer printing dyestuffs.

The process is characterized in that the aqueous dispersions of these dyestuffs are mixed with compounds of the formula $$R-Z$$

wherein
R denotes a hydrophobic radical with at least 5 C atoms and
Z denotes the groups —COOH, —NH$_2$, —O(C$_2$H$_4$O)$_n$H, —NX$_1$X$_2$ or —NH(CH$_2$)$_m$NX$_1$X$_2$,
in which
n is 0, 1 or 2,
m is 2–6 and
X$_1$/X$_2$ is H or C$_1$–C$_4$-alkyl,
with the proviso that R represents a non-cyclic aliphatic radical when Z represents COOH, and the aqueous mixtures are converted into dry pulverulent form in a manner which is in itself known.

The preparation can easily be dispersed in organic media, for example in organic solvents such as those customary in the preparation of printing pastes, and are outstandingly suitable for the preparation of printing inks for printing temporary supports for heat transfer printing.

7 Claims, No Drawings

PROCESS FOR THE PREPARATION OF DYESTUFF FORMULATIONS

The subject of the invention is a process for the preparation of pulverulent formulations, which can be dispersed easily in organic media, of dyestuffs which are sublimable at 100° to 230° C.

The process is characterised in that the aqueous dispersions of these dyestuffs, or the aqueous solutions or dispersions of the dyestuff precursors, are mixed with compounds of the formula $$R-Z \qquad (I)$$

wherein
R denotes a hydrophobic radical with at least 5 C atoms and preferably at least 10 C atoms and
Z denotes the groups —COOH, —$NH_2$, —$O(C_2H_4O)_nH$, —$NX_1X_2$ or —$NH(CH_2)_mNX_1X_2$,
in which
n represents 0, 1 or 2,
m represents 2–6 and
$X_1/X_2$ represents H or $C_1$–$C_4$-alkyl,
with the proviso that R represents a non-cyclic aliphatic radical when Z represents COOH,
where appropriate the dyestuff precursors are converted into the corresponding dyestuffs, and the aqueous mixtures are converted into the dry pulverulent form in a manner which is in itself known.

The radicals R, which are preferably alkyl radicals, can be saturated or unsaturated, straight-chain, cyclic or branched and can also optionally be interrupted by arylene radicals or cycloalkylene radicals as well as hetero-atoms and be substituted by substituents provided these do not substantially impair the hydrophobic character of the radical R.

Suitable substituents are: phenyl, naphthyl, cyclohexyl, halogen, nitro, $C_1$–$C_4$-alkoxy and the like.

Suitable arylene radicals are phenylene radicals. Suitable cycloalkylene radicals are, for example, cyclohexylene radicals. Suitable hetero-atoms are O, S, $NX_1$, CO or P. Preferably, 0 to 2 of these radicals or hetero-atoms are present.

Particularly preferred compounds of the formula I are those of the formula $$R'-Z' \qquad (II)$$

wherein
R' represents $C_{10}$–$C_{20}$-alkyl and
Z' represents $NH_2$, $NH(CH_2)_3$—$NH_2$ or, preferably, OH.

The compounds R-Z are preferably insoluble in water.

Suitable compounds of the formula I are: cetyl alcohol, lauryl alcohol, stearyl alcohol, oleyl alcohol, abietyl alcohol, hydrobietyl alcohol, nonylphenol, benzyl alcohol, cyclohexanol, ethylene glycol monolauryl ether, oleic acid glycol mono-ester, 2-hydroxy-ethyl-oleic acid amide, glycerol monolaurate or dilaurate, abietylamine, stearylamine, oleylamine, hydroabietylamine, benzylamine, cyclohexylamine, N-stearyl-propylene-1,3-diamine, N-tallowalkyl-propylene-1,3-diamine, N-cyclohexyl-propylene-1,3-diamine, oleic acid and stearic acid.

The water-insoluble types of the formula I are preferably employed in the form of their aqueous dispersions, which are prepared using customary nonionic or anionic dispersing agents.

Finally, a particular variant of the process according to the invention is that the compounds of the formula I are in the form of those modified water-insoluble derivatives which, under the conditions under which the abovementioned aqueous mixtures are worked up, split, under the influence of acids or alkali, into the (free) compounds of the formula I.

Such hydrolysable derivatives of the compounds of the formula I are described, for example, in Claims 3–10 of British patent specification No. 1,368,385. The saponifiable carboxylic acid esters and sulphuric acid esters are preferred.

Examples which may be mentioned are: the sulphuric acid half-ester of coconut fatty alcohol, succinic acid mono-(2-ethylhexyl) ester, sulphosuccinic acid di-(2-ethylhexyl) ester, 4-sulphophthalic acid di-(2-ethylhexyl) ester, sulphuric acid mono-(β-undecylsulphonylamino)-ethyl ester, lauric acid β-sulphoethyl ester, oleic acid β-sulphoethyl ester, oleic acid polyglycol ester with 8 ethylene oxide, dimethylbenzylammoniumacetic acid hexadecyl ester and N-hexadecyl-N'-dimethyl-amidinium methosulphate.

Splitting off this compound is effected with customary dilute inorganic or organic acids or with dilute alkalis at elevated temperatures (again compare the Patent Specification cited above).

The compounds of the formula I and their modified derivatives are generally employed in amounts of 0.1 to 50, and preferably 1–10,%, relative to the pure dyestuff.

Aqueous press cakes, such as are customarily obtained during manufacture, or aqueous dyestuff dispersions ground on customary wet comminuting units, preferably high-speed stirred ball mills, can preferably be used as the aqueous dispersions of dyestuffs which are employed in the process according to the invention.

In addition to the additives according to the invention, customary auxiliaries, such as anionic, nonionic or cationic surface-active agents, can also be added to the dyestuff dispersions.

It is also possible already to add these surface-active agents, and the compounds I, or their saponifiable derivatives, during the preparation of the dyestuffs. The splitting of the saponifiable derivatives can also be effected during or after the preparation of the dyestuffs.

The aqueous dispersions provided with the additives are worked up according to a customary method, for example by filtering (with and without rinsing), drying (for example in a drying cabinet or by drum drying, spray drying or freeze-drying) and optionally grinding. However, it is also possible to dry the aqueous dispersions without filtering and optionally to grind them.

Formulations of azo dyestuffs are particularly advantageously prepared by adding the compounds I, or their derivatives which can be split, to the solution of the coupling component, combining the latter, optionally after precipitation by adding acid, with a diazonium salt solution and isolating the dyestuff.

Suitable dystuffs for the preparation of the formulations according to the invention are disperse dyestuffs of very diverse categories of dyestuffs and brighteners and above all compounds of the azo and anthraquinone series. Particularly preferred dyestuffs are dyestuffs which sublime in the range of 160°–220° C., such as those customarily used in transfer printing (compare, for example, British patent specification No. 1,221,126).

Examples which may be mentioned are: C.I. Disperse Yellow 60 No. 12,712, C.I. Disperse Yellow 3 No. 11,855, C.I. Disperse Red 5 No. 11,215, C.I. Disperse Red 13 No. 11,115, C.I. Disperse Red 4 No. 60,755, C.I. Disperse Violet 1 No. 61,100, C.I. Disperse Blue 19 No. 61,110, C.I. Disperse Blue 14 No. 61,500, C.I. Disperse Blue 3 No. 61,505 and C.I. Disperse Blue 26 No. 63,305.

Sublimable carbinol bases and carbinol base derivatives (especially ethers) of cationic dyestuffs are also suitable (compare DT-OS (German Published Specifications) Nos. 2,323,538, 2,324,017, 2,325,154 and 2,325,155).

The formulations prepared by the process according to the invention can easily be dispersed in organic media, for example in organic solvents such as those customary in the preparation of printing pastes, and are outstandingly suitable for the preparation of printing inks for printing temporary supports for heat transfer printing.

In the examples which follow "parts" denote parts by weight.

EXAMPLE 1

160 Parts of a water-containing press cake, which consists of 60 parts of water and 100 parts of the blue dyestuff of the formula

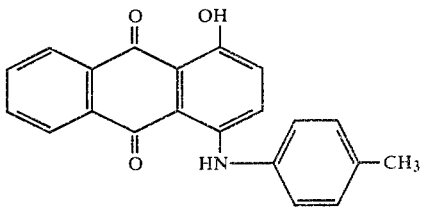

are stirred in 237 parts of water with the addition of 3 parts of the sodium salt of coconut fatty alcohol monosulphuric acid ester. This suspension is then ground in a high-speed stirred ball mill, such as is described, for example, in the journal "Farbe und Lack" 71, (1965), page 377 et seq. and 75 (1969), page 953 et seq., and in DAS (German Published Specification) No. 1,230,657, for 60 minutes with glass beads with a diameter of 0.3-0.4 mm. After the glass beads have been separated off, the pH value of the dyestuff dispersion is adjusted to 1 by adding dilute hydrochloric acid and the dispersion is heated to 80°-90° C. for 4 hours in order to saponify the sulphuric acid ester of the coconut fatty alcohol. The dyestuff is then filtered off, washed until neutral and dried at 50°-60° C. under reduced pressure.

If 80 g of the formulation prepared in this way are stirred in a mixture consisting of 650 g of ethanol, 50 g of ethylene glycol monoethyl ether, 150 g of a maleate resin, 50 g of N4 ethylcellulose and 20 g of polyethylene wax for ten minutes by means of a dissolver, a flexographic printing paste in a good fine state of division is obtained with which speck-free pastel shades which are outstandingly suitable for transfer printing and have sharp outlines can be printed onto paper (80 g/m²), which is coated on both sides with 7 g/m² of starch, as a temporary support. Heat transfer printing onto textile or non-textile synthetic materials is effected according to known processes, such as those described, for example, in German Offenlegungsschrift (German Published Specification) No. 1,769,757.

EXAMPLE 2

100 Parts of the blue disperse dyestuff according to Colour Index No. 63,305 are dissolved, in the form of the crude product obtained from the customary preparation thereof, in 500 parts of 96% strength sulphuric acid and this solution is allowed to run into 4,000 parts of ice water, in which 5 parts of the sodium salt of coconut fatty alcohol monosulphuric acid ester have been dissolved, whilst stirring. This dyestuff dispersion is heated to 80°-90° C. for 30 minutes. The reprecipitated dyestuff is filtered off, washed with 1,000 parts of water and again stirred into 2,000 parts of water, the pH is adjusted to 7 by adding a little sodium hydroxide solution and the dyestuff is filtered off, washed until sulphate-free and dried at 50°-60° C. under reduced pressure.

An outstanding flexographic printing paste is obtained, analogously to Example 1, from this formulation.

EXAMPLE 3

(a) 100 Parts of the red dyestuff of the formula

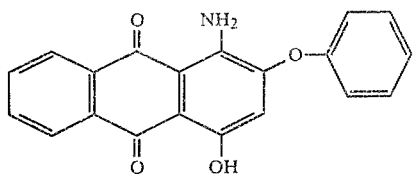

are stirred into a solution of 2 parts of a condensation product of formaldehyde and naphthalenesulphonic acid in 298 parts of water. This suspension is ground in a high-speed stirred mill for 30 minutes with glass beads 0.3-0.4 mm in diameter. The dyestuff dispersion is separated from the glass beads by sieving.

(b) A solution of 5 parts of the sodium salt of coconut fatty alcohol monosulphuric acid half-ester in 500 parts of water runs into the dyestuff dispersion prepared according to (a), whilst stirring. The mixture is acidified to pH 1 by adding dilute hydrochloric acid and is heated to 80°-90° C. for 4 hours. The dyestuff is then filtered off, washed until neutral and dried at 50°-60° C. under reduced pressure.

(c) An emulsion, which is prepared from 10 parts of a fatty alcohol mixture in which the aliphatic alkyl chains contain 12-14 carbon atoms, 2 parts of nonylphenol hexaglycol ether and 500 parts of water by stirring by means of a dissolver, runs into the dyestuff dispersion described under (a). The dyestuff is isolated as described under (b).

(d) Letterpress printing pastes and offset printing pastes which are outstandingly suitable for printing temporary supports for heat transfer printing can be prepared easily by known processes from the formulations obtained according to (b) or (c).

EXAMPLE 4

(a) 138 Parts of p-nitroaniline are diazotised at 10°-15° C. in a mixture consisting of 2,500 parts of ice water and 250 parts of 36% strength hydrochloric acid by adding a solution which contains 69 parts of sodium nitrite dissolved in 250 parts of water. This diazonium salt solution is cooled to −5° C. by adding about 2,000 parts of ice and then runs into a solution which is at 0°

C. and is prepared from 180 parts of N-ethyl-N-cyanoethyl-aniline, 130 parts of 36% strength hydrochloric acid and 700 parts of ice water. The coupling reaction has ended after about 12 hours.

(b) A solution of 15 parts of N-tallow-alkyl-propylene-1,3-diamine in dilute acetic acid is added to the dyestuff suspension prepared according to (a). The pH is adjusted to 8 by adding sodium hydroxide solution, whilst stirring. The dyestuff is filtered off, washed with water until salt-free and dried at 50°-60° C. under reduced pressure.

(c) The dyestuff is isolated from the suspension prepared according to (a) by filtration. The acid filter cake is stirred into 5,000 parts of water and, after adding a solution of 15 parts of the sodium salt of coconut fatty alcohol monosulphuric acid half-ester in 1,500 parts of water, the mixture is heated to 80°-90° C. for 2 hours. The dyestuff is then filtered off, washed with water until neutral and dried at 50°-60° C. under reduced pressure.

(d) Orange flexographic printing pastes which give excellent prints on temporary supports suitable for transfer printing are obtained by the process indicated in Example 1 from the formulations prepared according to (b) and (c).

EXAMPLE 5

150 Parts of mono-acetyl-p-phenylenediamine are diazotised at 0°-5° C. in a mixture consisting of 1,600 parts of ice water and 270 parts of 36% strength hydrochloric acid by adding a solution which contains 69 parts of sodium nitrite dissolved in 250 parts of water. This diazonium salt solution runs into a solution which is at 0°-5° C. and is prepared from 113.4 parts of p-cresol, 3,000 parts of ice water, 40 parts of sodium hydroxide, 170 parts of sodium carbonate and 7 parts of a sodium alkylsulphonate in which the aliphatic alkyl chains contain 12-18 carbon atoms, whilst stirring. The coupling reaction has ended after about 10 minutes. A solution which consists of 27 parts of stearic acid, 5 parts of sodium hydroxide and 300 parts of water is added, whilst stirring. The mixture is stirred for a further 30 minutes, the pH is adjusted to 1 by adding dilute hydrochloric acid, the yellow dyestuff is filtered off and the filter cake is washed with water until neutral and dried at 50°-60° C. under reduced pressure.

An excellent flexographic printing paste which is outstandingly suitable for printing temporary supports for heat transfer printing is obtained, analogously to Example 1, from this formulation.

We claim:

1. Process for the preparation of pulverulent formulations suitable for use in transfer printing, which can be dispersed easily in organic media, of dyestuffs which are sublimable at 100°-230° C., wherein aqueous dispersions of said dyestuffs or aqueous solutions or dispersions of precursors of said dyestuffs are mixed with compounds of the formula

R—Z wherein
R is $C_{10}$-$C_{20}$-alkyl, and
Z is $NH_2$, $NH(CH_2)_3$—$NH_2$ or OH, converting any of said precursors into the corresponding dyestuffs, and drying the resulting aqueous solution or dispersion into a dry pulverulent product.

2. Process according to claim 1, wherein Z represents OH.

3. Process according to claim 1, wherein said dyestuffs or said precursors are mixed with compounds which, under the influence of acids or alkali, are split into R—Z.

4. Process according to claim 3, wherein R—Z is

RO—A—O—X wherein
R is $C_{10}$-$C_{20}$ alkyl;
A represents the radical of a polyfunctional, polybasic acid and
X represents H or a cation.

5. Process according to claim 4, wherein

A is —$SO_2$—, —PO(OH)—, —PO(OR)—, —$SO_2$—B—$SO_2$—, —$SO_2$—B—CO—, or —CO—B—CO, wherein
B is a lower alkylene radical or arylene radical which is unsubstituted or substituted by carboxyl, ester or sulphonic acid.

6. Process according to claim 3, wherein R—Z is $$R-\overset{O}{\underset{\|}{C}}-YV$$

wherein
R has the meaning indicated in claim 3;
Y is O or NH, and
V is —$(CH_2)_p$—$SO_3X$, —$(CH_2$—$CH_2$—$O)_q$—H, or —$CH_2$—$CH_2$—$N(CH_2$—$CH_2OH)_2$,
p is an integer from 2-4,
q is an integer greater than 3, and
X is H or a cation.

7. Formulations obtained according to claim 1.

* * * * *